US006538340B2

(12) United States Patent
Elder

(10) Patent No.: US 6,538,340 B2
(45) Date of Patent: Mar. 25, 2003

(54) WIND TURBINE SYSTEM

(75) Inventor: Dillyn M. Elder, Fort Collins, CO (US)

(73) Assignee: Headwinds Corporation, Dallas, TX (US)

( * ) Notice: Subject to any disclaimer, the term of this patent is extended or adjusted under 35 U.S.C. 154(b) by 22 days.

(21) Appl. No.: 09/923,043

(22) Filed: Aug. 6, 2001

(65) Prior Publication Data

US 2003/0025335 A1 Feb. 6, 2003

(51) Int. Cl.[7] ................................................ F03D 3/04
(52) U.S. Cl. ........................................ 290/55; 290/44
(58) Field of Search ............................ 290/43, 44, 54, 290/55

(56) References Cited

U.S. PATENT DOCUMENTS

| | | | | |
|---|---|---|---|---|
| 4,224,528 A | * | 9/1980 | Argo | 290/55 |
| 4,494,007 A | * | 1/1985 | Gaston | 290/44 |
| 4,857,753 A | * | 8/1989 | Mewburn-Crook et al. | 290/55 |
| 5,038,049 A | * | 8/1991 | Kato | 290/55 |
| 5,391,926 A | * | 2/1995 | Staley et al. | 290/55 |
| 5,852,331 A | * | 12/1998 | Giorgini | 290/55 |
| 6,172,429 B1 | * | 1/2001 | Russell | 290/54 |
| 6,191,496 B1 | * | 2/2001 | Elder | 290/55 |
| 6,320,273 B1 | * | 11/2001 | Nemec | 290/55 |
| 6,448,668 B1 | * | 9/2002 | Robitaille | 290/54 |
| 6,448,669 B1 | * | 9/2002 | Elder | 290/54 |

* cited by examiner

Primary Examiner—Nicholas Ponomarenko

(57) ABSTRACT

The present invention relates to an improved turbine used to convert wind into mechanical energy, more specifically, a long axis type of vertical-axis turbine allowing large columns of wind to be harnessed. These devices differ from horizontal-axis (propeller) type windmills which typically rotate about a vertical axis in order that they may face directly into a wind. The improvement includes constructing the components of the invention from lightweight materials which allow the enhanced conversion of wind kinetic energy into mechanical energy by the wind turbine. The preferred materials include honeycomb sandwich panels manufactured from non-metallic materials such as aramid fiber. The present invention is designed to be employed as a cost effective alternate power source in any wind from a breeze to a gale wind. To increase the structural integrity, the torque generating elements, namely, the rotor blades, are not directly attached to the shaft but rather, they attach to the round top and bottom rotor cage plates through which torque forces generated can be transferred to the shaft. The unique design of an open cover on the top of the wind turbine allows wind from the direction above the turbine to be harnessed. The top shield structure has created a calm wind area between the shield and the top of the rotor cage that helps reduce turbidity and greatly facilitates wind exhaust from the system.

51 Claims, 14 Drawing Sheets

WIND TURBINE SYSTEM

FIELD OF THE INVENTION

The present invention relates to improved vertical-axis wind turbines with enhanced conversion of wind kinetic energy into mechanical energy. Vertical-axis turbines are typically of a long axis type, allowing large columns of air to be harnessed. These devices differ from horizontal-axis (propeller) type windmills which typically pivot about a vertical axis in order that they may face directly into a wind. The improvement of the invention comprises the use of lightweight materials for the construction of the components of the wind turbine. Lightweight materials such as non-metallic composite sandwich panels are preferred. The vertical-axis turbines of this invention are designed to be employed as a cost effective alternate power source in any wind condition.

BACKGROUND OF THE INVENTION

Wind as a source of energy is a concept that has been promoted for some time. According to one source, there is evidence which shows that windmills were in use in Babylon and in China as early as 2000 B.C. The United States Patent and Trademark Office has granted patents on windmill devices dating back to the early to mid 1800's. Despite the continued research and development in this age old technology, until the present invention, no windmill or wind turbine device has successfully appropriately addressed some of the most important problems which have seemingly made the harnessing of wind not economically feasible. While wind is unquestionably a large potential source of energy, estimated to be about 5 kW per acre in the United States, its variability in velocity has made it an unreliable source. Many devices such as U.S. Pat. No. 4,850,792 to Yeoman, U.S. Pat. No. 4,035,658 to Diggs and U.S. Pat. No. 2,406,268 to Terhune have relied on the ability of concentrating low to moderate winds for producing power. Others, like those shown in U.S. Pat. No. 4,834,610 to Bond and U.S. Pat. No. 4,075,500 to Oman, et al. (a horizontal-axis turbine), have accomplished the harnessing variable wind speeds by using modern variable speed governors. No device currently known to the present inventors is capable of adequately harnessing low and high-winds for power production. High winds are characterized, for purposes of discussion as currents having average velocities above 45 m.p.h., or having gusts greater than 60 m.p.h. Many devices are designed to fold and/or feather in winds reaching certain levels. Such devices are illustrated in U.S. Pat. No. 4,818.181 to Kodric, U.S. Pat. No. 4,632,637 to Traudt, and U.S. Pat. No. 3,942,909 to Yengst. These techniques, while intended to protect the structural integrity of the windmill, decrease a device's ability to produce power. Others, such as U.S. Pat. No. 5,391,926 to Staley and Elder, attempt to harness high winds emanating from any direction for power production but low to moderate winds have been unable to produce adequate torque for continual reliable power generation. Until the present invention variable winds have been an untapped source of energy by those skilled in the relevant art.

In the past, wind driven power generators of all sorts have attempted to harness the energy present in the wind. Some have concentrated their efforts in the low to moderate wind range and suffer periodic damage from the occasional high wind while others work well in the moderate to high wind range with little or no success in harnessing low speed wind. No prior art has effectively drawn useable power from the slight breeze all the way to gale force winds. Perhaps one of the biggest reasons for the lack of all wind turbines has to do with the structural integrity of typical wind devices. By design many are lightweight, inadequately supported, and made from insufficient materials. A number of these devices are comprised of a multitude of moving parts, such as rotors, stators, vanes, shields, and the like. These parts not only compromise the integrity of the machine, but also require continuous maintenance, repair and/or replacement. For such a device, which may produce only a few kilowatts of power, the costs soon begin to outweigh the benefits. Another concept widely used is to build large multi-story wind turbines capable of producing at or near the megawatt level. Two such devices are shown in U.S. Pat. No. 3,902,072 to Quinn, and U.S. Pat. No. 3,994,621 to Bogie. It is believed that these devices would cost close to $100 million to build and several hundred thousand to maintain each year. Another example is the 1.25 MW generator installed near Rutland, Vt. This is believed to be the largest windmill ever built in the United States, having two main blades each 175 feet in diameter. This facility operated intermittently between 1941 and 1945, during the war years when most resources were being used for war efforts. In 1945 one of the blades broke due to material fatigue and was never repaired, presumably due to a lack of cost efficiency. Similar to the smaller units, these large devices become cost prohibitive on a much larger scale. The present invention solves this second problem by presenting a low cost, low maintenance, cost efficient wind turbine. While certain aspects of the design have been known, until the present invention the proper combination of elements, new and old, has not been achieved to provide a commercially viable product.

Variable wind velocity is not, of course, the only obstacle in harnessing kinetic energy from the wind. Wind direction has been another area of study and development. Wind currents are typically unpredictable, and due to topography, upper air disturbances, changing weather patterns, or seasonal variations, they rarely blow in the same direction for any substantial length of time. For this reason effective wind machines must be capable of immediately accommodating winds from a full 360 degrees. Some devices have attempted to accomplish this goal with pivoting shields, and stators or wind directing vanes. U.S. Pat. No. 4,474,529 to Kinsey, U.S. Pat. No. 537494 to Stevens et al., the Yengst patent, and many other devices illustrate such an approach. As mentioned previously, additional moving parts usually detract from a machine's cost effectiveness. While not in the field of the present invention horizontal-axis machines typically pivot the entire rotor assembly so that it may face upwind. Still other designs leave the rotor assembly open (that is, no wind directing vanes or stators are utilized) so that winds from any horizontal direction may impart rotation upon the rotor assembly. This leaves the rotor completely open to the harshness and destructive abilities of the wind. Once again the present invention solves this problem by providing 360 degrees of wind reception, in all types of wind conditions.

One important application of a wind turbine able to respond to wind from all directions and of variable velocity is as a power generator on top of tall buildings. One reason for this is that wind velocity typically increases with altitude above the ground. For example, the wind velocity at the top of a 36 story building is on average 18 mph faster than on the ground, and is typically 45 mph faster at the top of a 70 story building. As another example, the wind velocity at the top of the Sears Tower in Chicago, Ill., averages 70 mph. This wind at the tops of tall buildings is clearly a potential power source. A wind turbine large enough to be economically useful on top of a tall building would measure about 20 feet tall by 20 feet wide. A wind turbine of this size built out of traditional materials such as ½ inch thick steel plates would weigh about 28,000 pounds, and additional bracing required to hold the turbine in place would weigh as much as 60,000 pounds. A problem with a turbine of this size is that it would unresponsive to light wind as it would require a wind velocity of at least 18 mph before it would begin to turn. There is also a gyroscopic effect associated with the turbine as it begins to rotate that increases with increasing rotational speed that would cause additional stress to the building in response to the torque on the turbine. In addition, traditional materials such as steel, due to its thermal conductivity, would begin to form ice on the turbine blades, which would negatively impact the smooth flow of wind through the turbine.

The present invention, in its various embodiments, recognizes and addresses these and other problems and overcomes many limitations encountered by those skilled in the art. Many devices and procedures have taught the use of folding or feathering in high wind conditions, and thus have been unable to realize the potential power of high winds. Others, such as the Staley and Elder patent have attempted to address the damaging characteristics of high winds by stressing structural integrity and durability to the point of sacrificing the ability to produce adequate torque in the low to moderate wind speed range. It is not economically feasible to build a wind turbine that can only produce mechanical power during periods of high wind. The entire range of wind conditions must be fully utilized for a wind turbine to be commercially viable. Problems such as high cost and high maintenance of most wind energy facilities exist in the field, but such problems have not been adequately addressed by those skilled in the art. While high velocity wind is a well known natural occurrence with high kinetic energy, its value in the field of vertical-axis wind turbines has not only been ignored to some extent, it has often been looked upon as a detriment. The prior art has taught away from the present invention by stressing rotor attachment and stator curvature. Rather than supplying a system which affords only an incremental increase in performance over the prior art, the present invention utilizes techniques which were not previously considered in order to achieve what may perhaps be leaps in performance compared to the prior art. Further, the present invention has achieved a more full utilization of a previously untapped precious natural resource, the wind.

SUMMARY OF INVENTION

The present invention discloses an improved wind turbine which provides enhanced conversion of wind kinetic energy into mechanical energy and which operates in all wind conditions, such as velocities up to 130 mph, and frequently changing wind directions. The improvement comprises the use of light weight modem building materials such as lightweight composite laminates to the reduce weight of the weight turbine and the improved thermal properties of such materials decrease the tendency of turbine blades to form ice. Non-metallic materials such as fiberglass or carbon fiber composite materials are as strong as steel but with only a fraction of the weight. The preferred materials are honeycomb sandwich panels that typically feature a honeycomb core manufactured from an aramid fiber with various non-metallic face layers, such as epoxy, fiberglass, phenols, and kevlar. Alternatively, lightweight metals such as aluminum can be used in the construction of the honeycomb core. The face layers can be laminated.

The wind turbine also provides a reliable and effective means for directing air currents into and out of the rotor cage assembly. Rather than supplying a system which affords only an incremental increase in performance and design over the prior art, the present invention utilizes combinations and techniques which were not previously considered to achieve an increase in performance unparalleled by the prior art. This invention serves to operate with a minimum number of movable parts and systems, to optimize potential power production by allowing energy from high winds to be harnessed as well as low and moderate winds, and to optimize air current intake and exhaust by providing immediate accommodations to winds from any given direction.

In general terms, the invention involves various embodiments of a vertical-axis wind turbine. Many of the elements of this device achieve several different objectives which, when combined, act to achieve the mentioned increases in performance. In the preferred embodiment, the invention discloses stationary stators for more effectively directing currents into the rotor cage assembly to impart a higher rotational velocity and greater torque upon the turbine shaft through some torque generating elements such as the rotor blades. In addition, the stationary stators provide a structural integrity necessary for operation during high wind conditions. This aspect also prevents the disruption of rotation by shielding the rotors from winds counter-directional to their rotation which may occur as the wind shifts. The present wind turbines comprise stator blades which are straight and wherein the stator blades are offset b optimal offset angle so that there is a minimal effect on the loss of wind kinetic energy.

Importantly, the invention breaks from several time honored traditions in harnessing wind. By recognizing and utilizing the potential energy of all winds, and by designing an apparatus with resistance to the destructiveness of these winds during standard operation the present invention achieves its goals.

Accordingly, the present invention provides an omni-wind, vertical-axis turbine which can be employed in many different environments including on the tops of tall buildings. The stated invention acts to convert wind currents into mechanical energy which energy may then be transferred from a turbine or the like to be used to directly act upon a water pump, or to drive an electrical generator (or more generically an energy-utilizing device) for use as an alternate power source. The turbine may be equipped with any number of rotors and stators which interact with the variable wind currents during operation. In addition, a minimum number of moving parts is used to increase reliability, to decrease maintenance, and to decrease production costs.

It is an object of the present invention to provide a wind turbine design and construction which is capable of operation with enhanced efficiency in a variety of wind conditions. Such conditions include, but are not limited to, winds from any direction which possess a horizontal component, even where such wind direction is capable of frequent changes, winds reaching velocities of 130 m.p.h. or more, and winds with continuously changing velocities. It is an object that the present invention be capable of standard operation during these conditions without any need for employing folding and feathering techniques, or a speed control or braking system.

It is another object of the present invention to provide an improved design which is capable of immediately accommodating winds from any direction having a horizontal component, as stated earlier. It is an object that this immediate readiness of the present invention be achievable with no moving parts.

It is, therefore, an object of the present invention to provide a design which utilizes a minimum of moving parts for improved reliability. It is an object that necessary maintenance and replacement of any parts should be minimized, and the durability of the entire apparatus be vastly improved. Furthermore, an object of this invention is to provide an improved wind turbine which can be used in various environments including tall buildings and which the turbine elements which resist icings.

Naturally, further objects of the invention are disclosed throughout other areas of the specification and claims.

DETAILED DESCRIPTION OF THE PREFERRED EMBODIMENTS

The following descriptions and referenced drawings are for selected preferred embodiments of the present invention. Naturally, changes may be made to the disclosed embodiments while still falling within the scope and spirit of the present invention and the patent granted to its inventor.

Figure 8A:
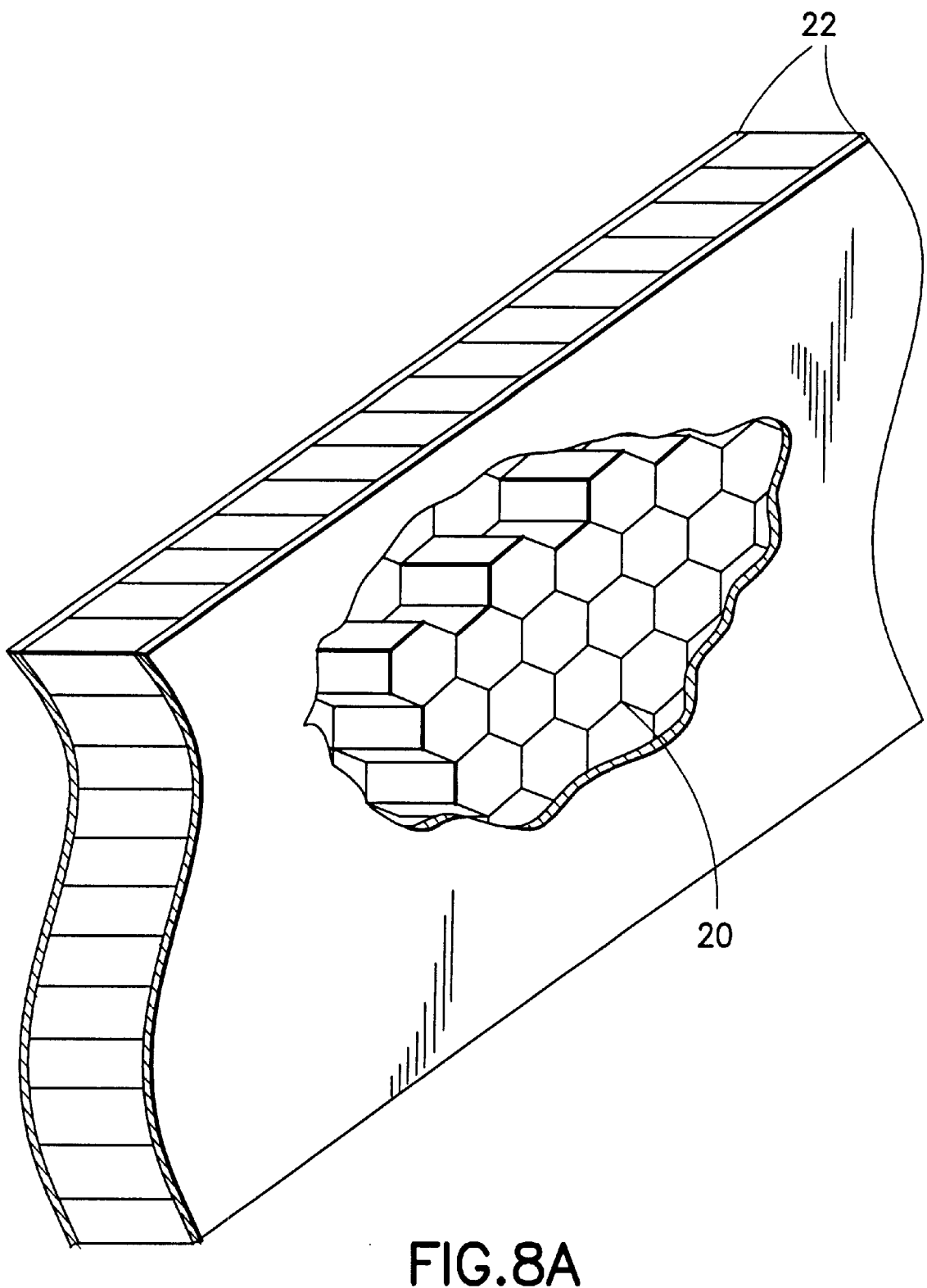
FIG. 8A is a cut-away view of a typical honeycomb panel used in the manufacture of the invention, depicting a hexagonal cell.
Figure 8B:
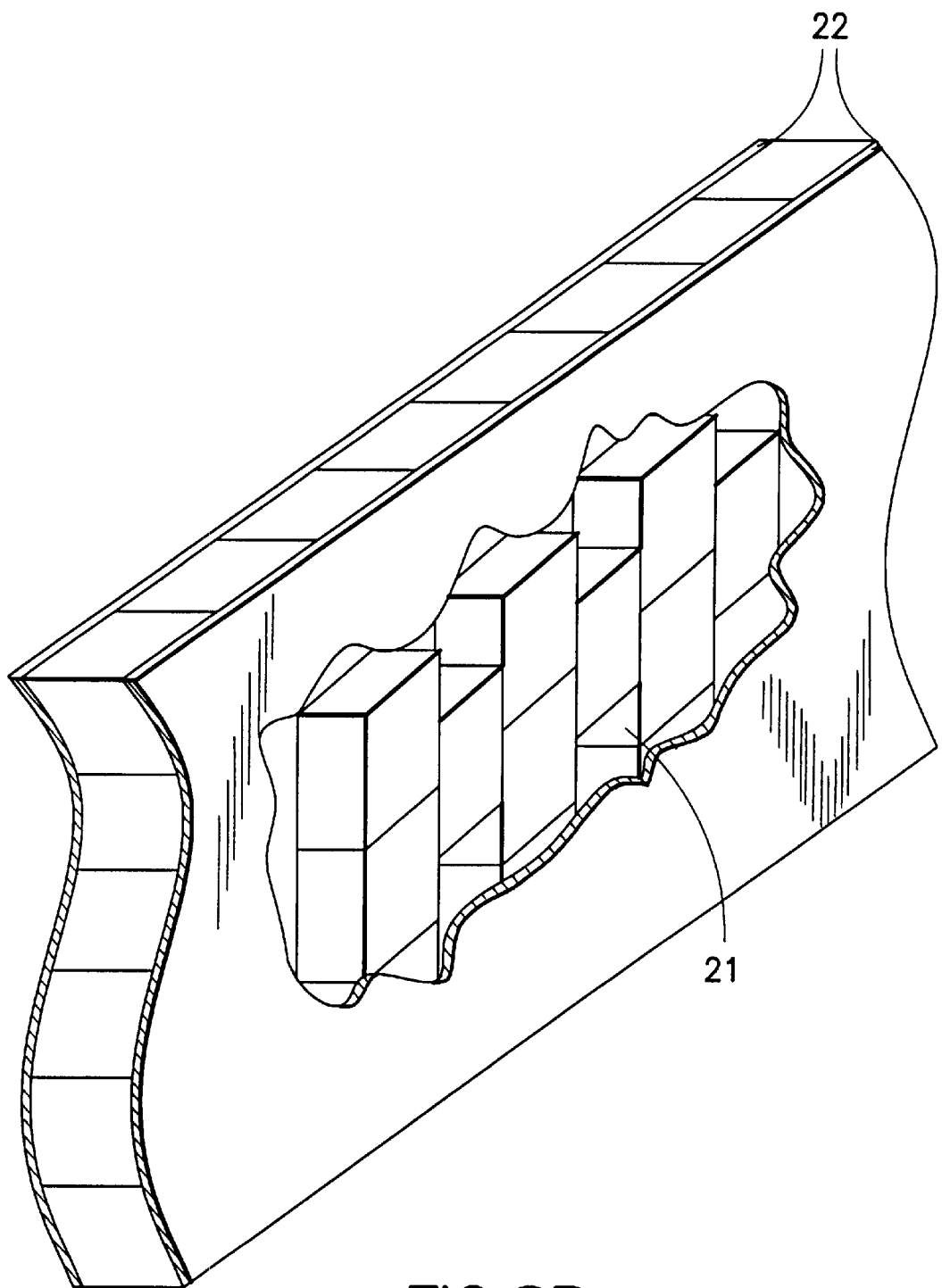
FIG. 8B is a cut-away view of a typical honeycomb panel used in the manufacture of the invention, depicting a rectangular cell.

The improvement of the invention comprises the use of lightweight materials which allow the enhanced conversion of wind kinetic energy into mechanical energy in the construction the components of a wind turbine. Such a construction is particularly important for embodiments intended for use on top of buildings. Non-metallic materials such as fiberglass or carbon fiber composite materials are as strong as steel but with only a fraction of the weight. The preferred materials are honeycomb sandwich panels such as, for example, those manufactured by the Euro-Composites® Group, depicted in FIGS. 8A and 8B. These panels typically feature a honeycomb core manufactured from an aramid fiber with various non-metallic face layers, such as epoxy, fiberglass, phenols, and kevlar. As can be seen from the figures, the cells of the honeycomb core extend perpendicular to the face layers of the panels. One type of honeycomb core features a hexagonal cell, depicted as (20) in FIG. 8A, while FIG. 8B depicts another type of honeycomb core utilizing a rectangular cell (21). The face layers (22) are typically laminated. Details about these materials can be found at the Euro-Composites® Group web site, euro-composites.com, the contents of which are incorporated herein by reference. Non-metallic carbon-fibers are the preferred construction materials, but as an alternative, a lightweight metal such as aluminum can be used in the manufacture of the honeycomb core.

As discussed above, a 20 foot by 20 foot turbine manufactured with ½ inch steel panels would weigh about 28,000 pounds, and would need additional bracing. An equivalent sized turbine manufactured from ¾ to ⅞ inch thick carbon fiber laminate panels would weigh only about 1,000 pounds, and would need no additional bracing. A turbine this light would be able to begin rotating in a wind velocity of only 5 mph, as apposed to the 18 mph required for the steel embodiment, and can rotate at a much higher angular velocity than the steel embodiment. A turbine having components made from the honeycomb sandwich panels can produce power in both lighter breezes and heavier winds than the steel embodiment. The light weight of the honeycomb sandwich panel turbine also reduces the additional stress placed on a building by the gyroscopic effects of the rotating turbine. In addition, the honeycomb sandwich panel turbine embodiment is more efficient than the steel turbine embodiment. For example, tests performed on a turbine that is 2 foot high by 4 feet in diameter indicate that a steel turbine operates at an efficiency of about 20.3%, that is, it converts about 20.3% of the wind kinetic energy into usable energy, such as electrical power. A fiberglass turbine of the same size operates at about 25.1% efficiency, and a turbine manufactured using honeycomb sandwich panels produced by the Euro-Composites® Group operate at about 32.3% efficiency. Unlike steel turbines, turbines manufactured from honeycomb sandwich panels become more efficient as the size of the turbine is increased, and efficiencies of up to 45% are possible. The honeycomb sandwich panel materials also have a much lower coefficient of thermal conductivity than metals such as steel, and thus will not form ice under normal operating conditions.

Figure 1:
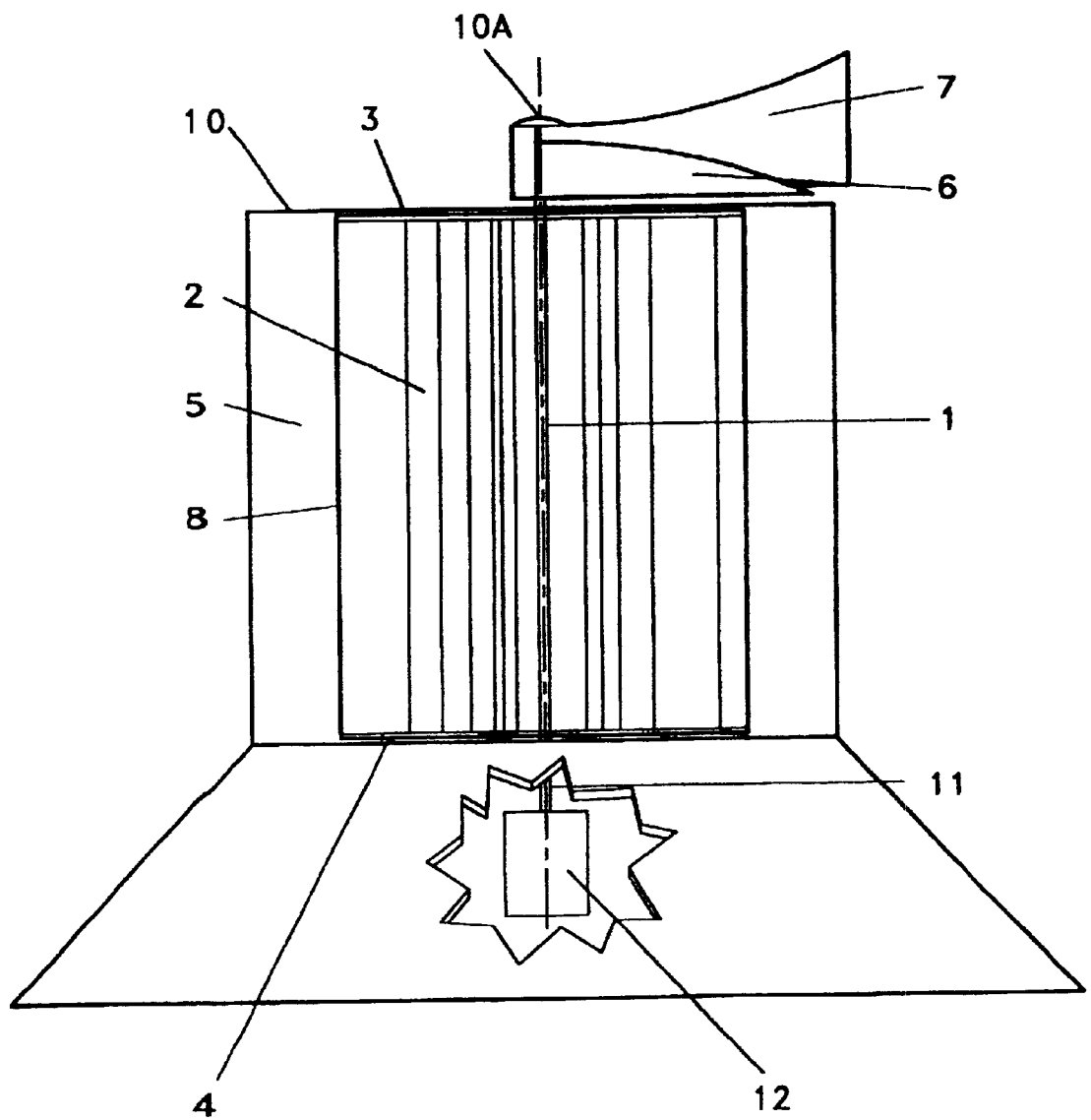
FIG. 1 is a perspective view of an embodiment of the invention from the side.
Figure 1A:
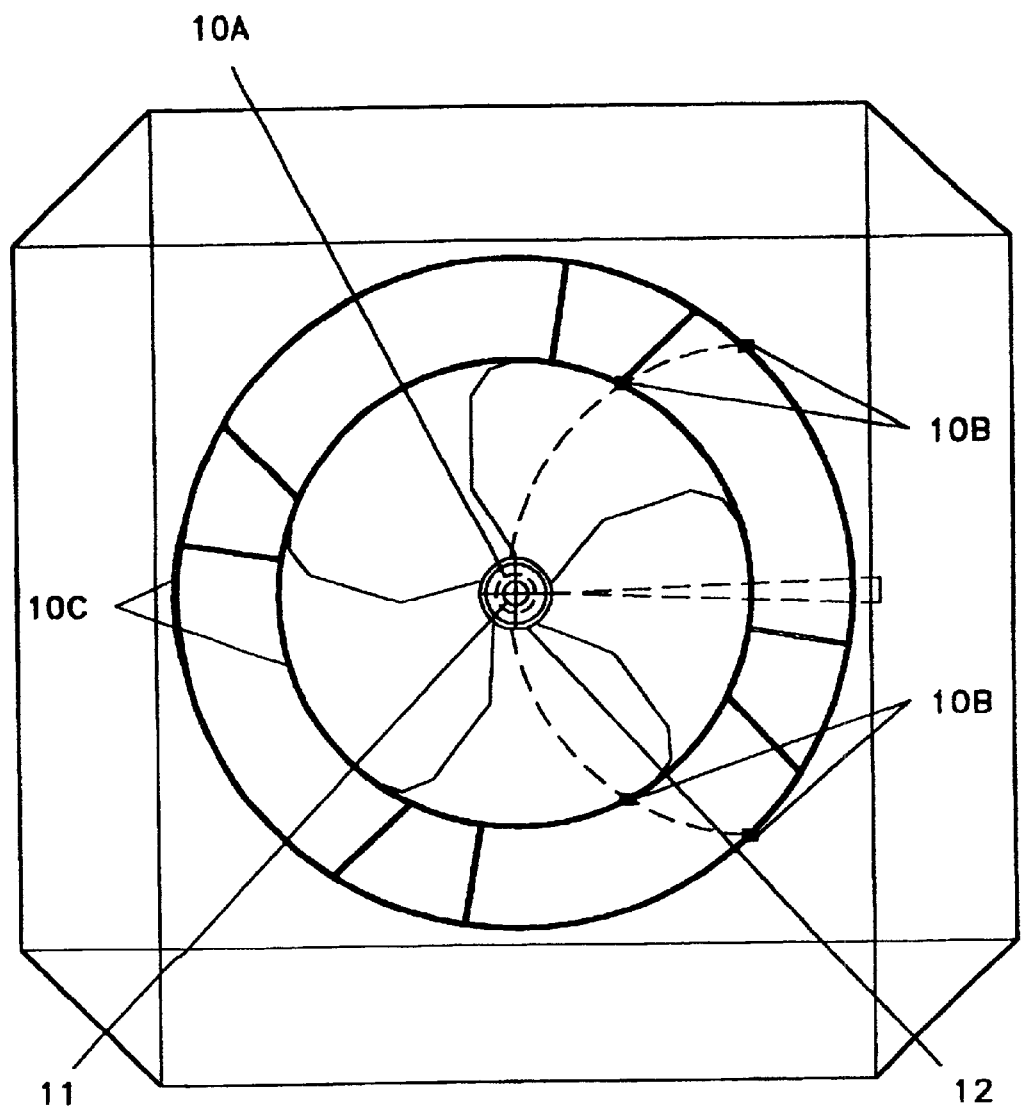
FIG. 1A is a perspective of the new invention from the top.
Figure 1B:
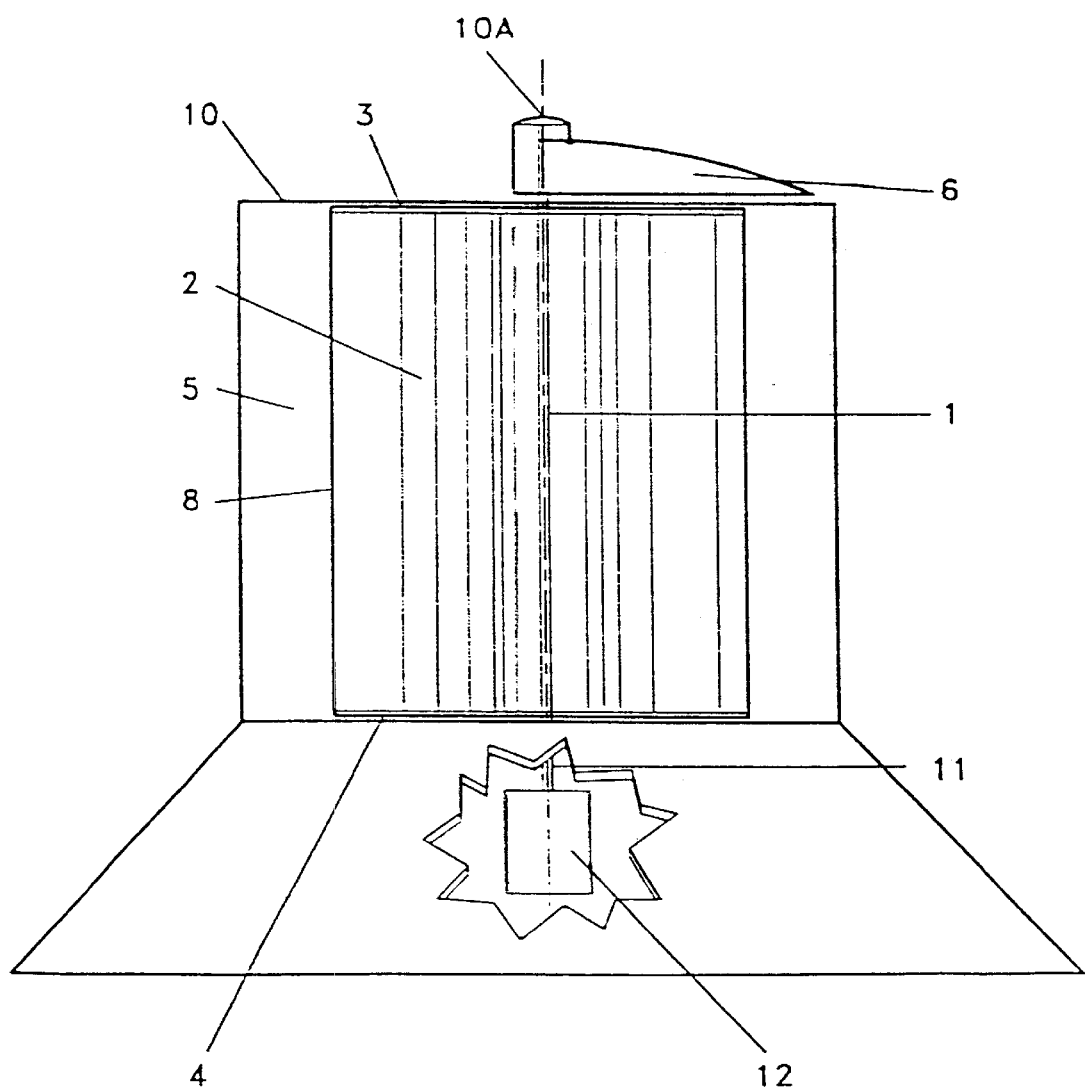
FIG. 1B depicts a side view of a second embodiment of the invention.

As can be seen from the drawings, the basic concepts of the present invention may be embodied in many different ways. FIGS. 1 and 1A show the preferred embodiment of the wind turbine (8) having a shaft (1) that is turned by rotor blades (2) that are attached to a top rotor cage plate (3) and bottom rotor cage plate (4) then drive an energy-transfer element (11) and an energy-utilizing device (12) (both shown as contained within or at the base). Each of these elements. The height of these rotor blades in one of the preferred embodiments is 4 feet 8 inches but will vary proportionally with the size of the unit built. In another preferred embodiment, intended for use on top of tall buildings, the rotor blades are at least 20 feet high by 20 feet in diameter. Furthermore, in accordance with preferred embodiments of the present invention, from 2 to 5 blade elements may be used. Wind is compressed and directed to the rotor blades (2) by numerous stator blades (5) which can also be constructed of light weight materials such as those described above. Wind with a downward diagonal thrust can be accommodated by the rotor blades (2) through use of an open stator cage cover (10) that renders the turbine (8) at least partially topless and increases efficiency by up to an estimated 20% over any prior art. Wind attempting to enter the turbine (8) against the prevailing wind direction and hence against the direction of the rotors is deflected by top shield (6). Top shield (6) has a central pivoting point and an outer terminus and moves about the open top of turbine (8) by use of a center bearing (10A) side bearings (10B) and bearing race (10C). The movement of the top shield (6) to a downwind position is aided by the top shield vane (7). FIG. 1B depicts a second embodiment of the present invention wherein top shield (6) is not provided with a vane. The top shield (6) creates an area on the downwind side of the turbine (8) that is of low turbidity and increases the invention's ability to exhaust wind passing through the machine. The top shield (6) does not at any time hinder the accommodation of productive winds from any direction. Wherever feasible, the described elements are made using light materials as hereinbefore described.

Figure 2:
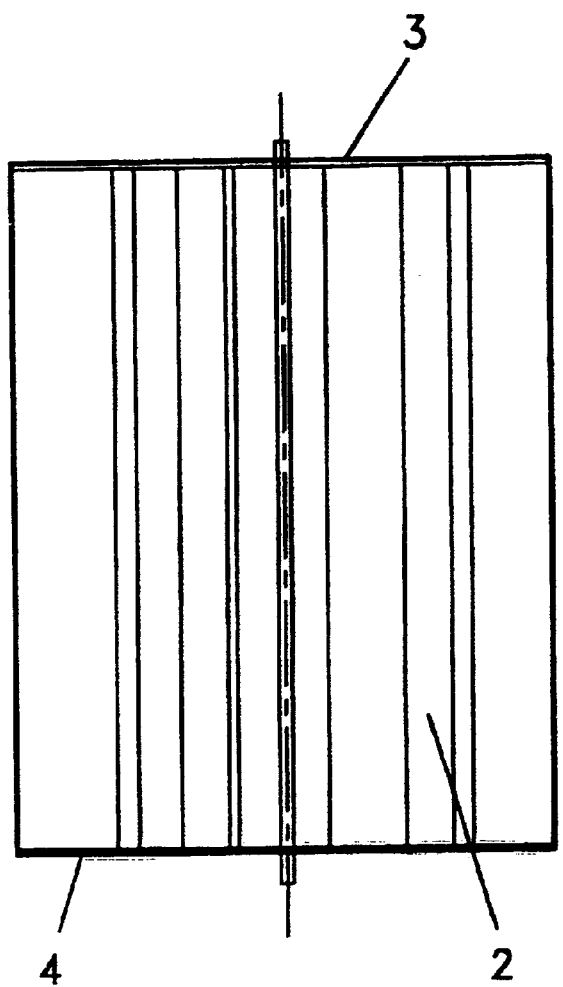
FIG. 2 is a view of the rotor cage from the side.
Figure 2A:
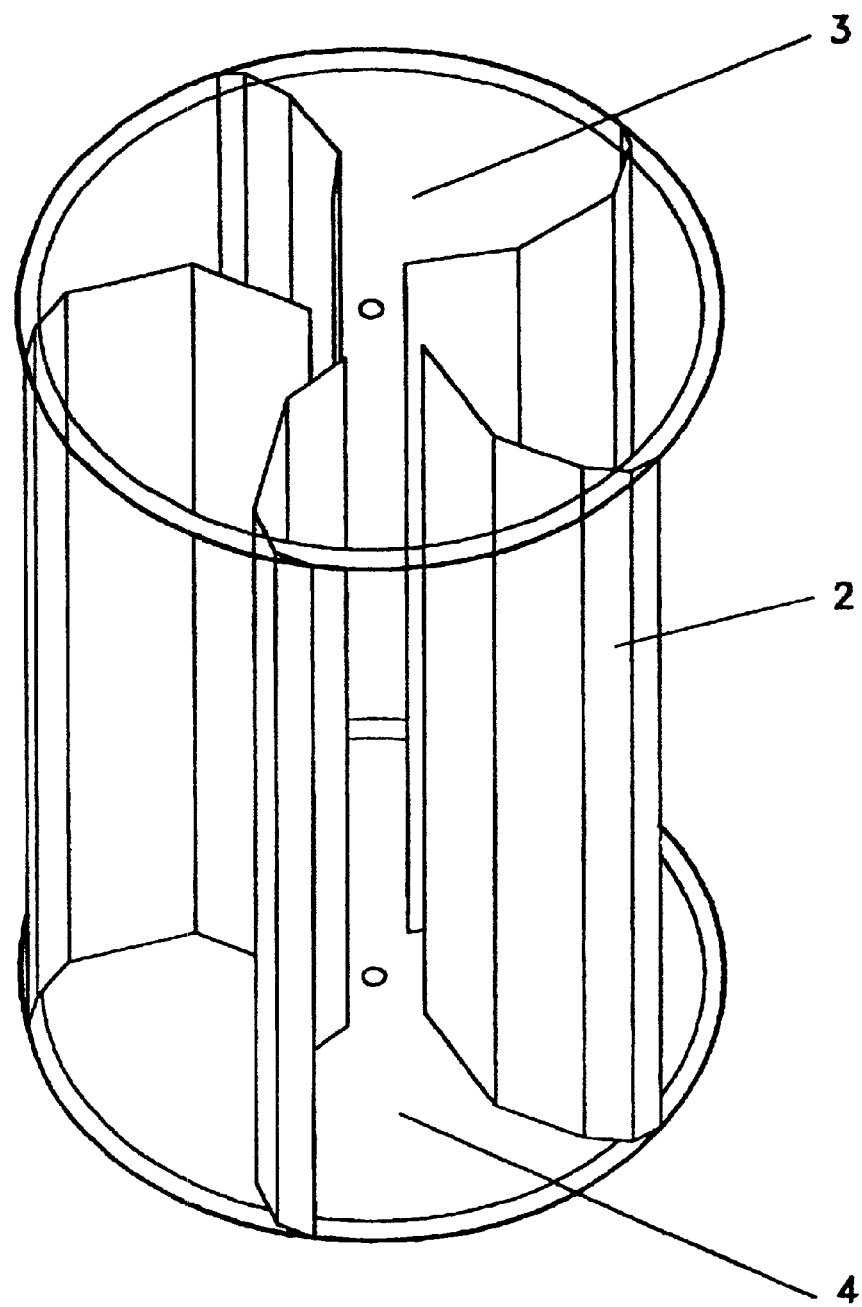
FIG. 2A is a conceptual drawing of the rotor cage assembly from the side.

FIGS. 2 and 2A show the rotor cage (1). Total rigidity and structural integrity may be enhanced by the top rotor cage plate (3) and the bottom rotor cage plate (4).

Please note that the top plate (3) may be arced slightly to better compress and direct air or other fluid into the rotor cage. A reverse angle on the bottom rotor cage plate (4) may accomplish the same task but with an upward thrust.

Only the top and bottom rotor cage plates may be attached to the shaft. This unique aspect can aid in the invention's ability to readily accept, utilize and exhaust wind or other fluid. Structural integrity and rigidity may be enhanced by the rotor blades being attached in two places rather than directly to the shaft as in previous art.

Figure 3:
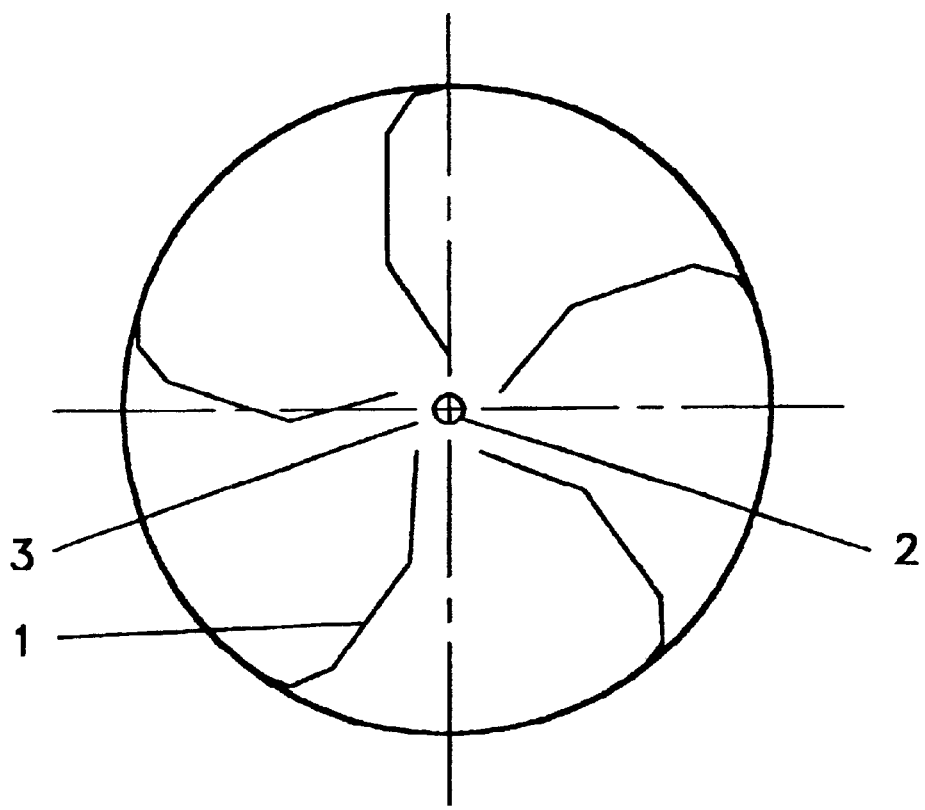
FIG. 3 is a perspective view of the rotor cage from the top showing the alignment of the rotor blades.

FIG. 3 shows the layout of the rotor blades (1) with respect to each other as well as to the shaft (2). Special note should be taken of the space (3) between the shaft (2) and the inside edge of the rotor blades (1). This space is a substantial component of one embodiment of the invention in a number of ways. First, by allowing some of the air to flow through the center of the machine, the air impacts the blade on the downwind side of the invention adding to thrust and aiding in the exhaust cycle. The space between the shaft and rotor can also achieve greater torque by pushing the kinetic energy of the wind to be exerted further away from the center point (i.e., the shaft). The flat surfaces of the rotor blades allow wind to impart its force and be immediately deflected. A curved or cupped surface (as described in previous art) may allow air to collect in the curvature and cushion the force of subsequent winds. The layout of the rotor cage in the preferred embodiment is shown but it must be mentioned that changes may be made to the layout without departing from the broad aspect of the present invention.

The deflected air from the rotor blades is also able to find its way through the space between the shaft and the rotor blades to aid in the invention's ability to exhaust. The space between the rotor blades and the shaft in the preferred embodiment vary proportionately with the size of the unit built.

Figure 4:
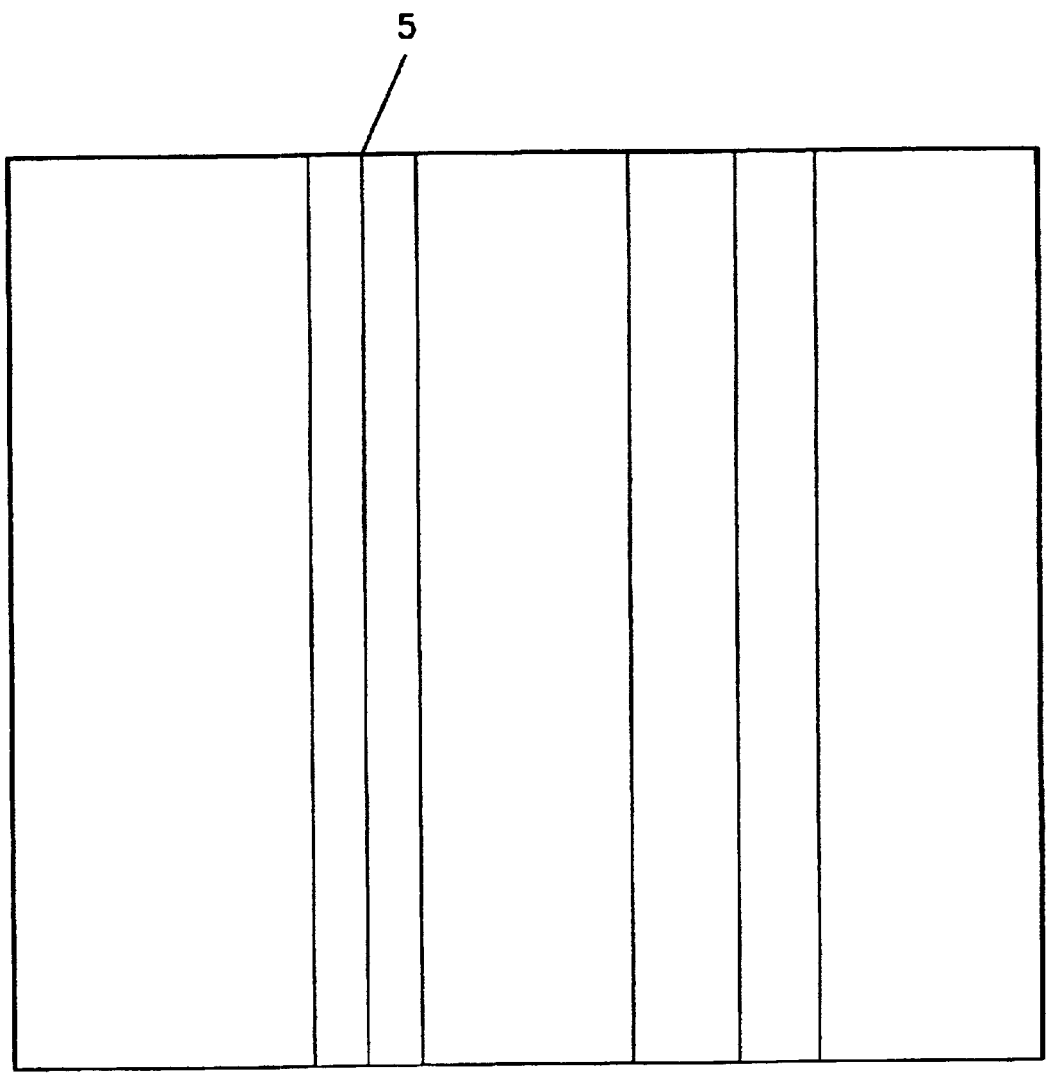
FIG. 4 is a view of the stator blades from the side.
Figure 4A:
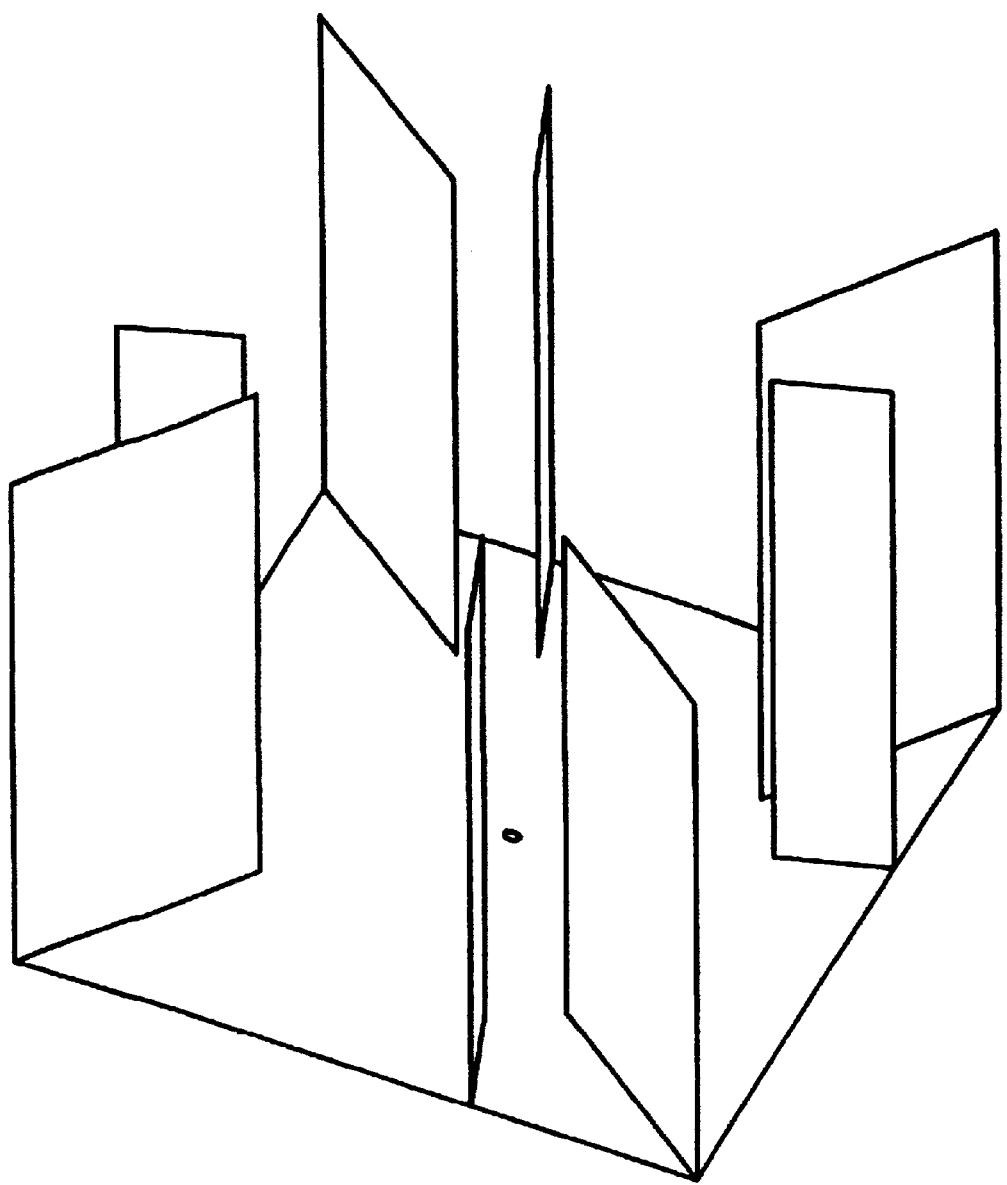
FIG. 4A is a conceptual drawing of the stator blades from the side.
Figure 4B:
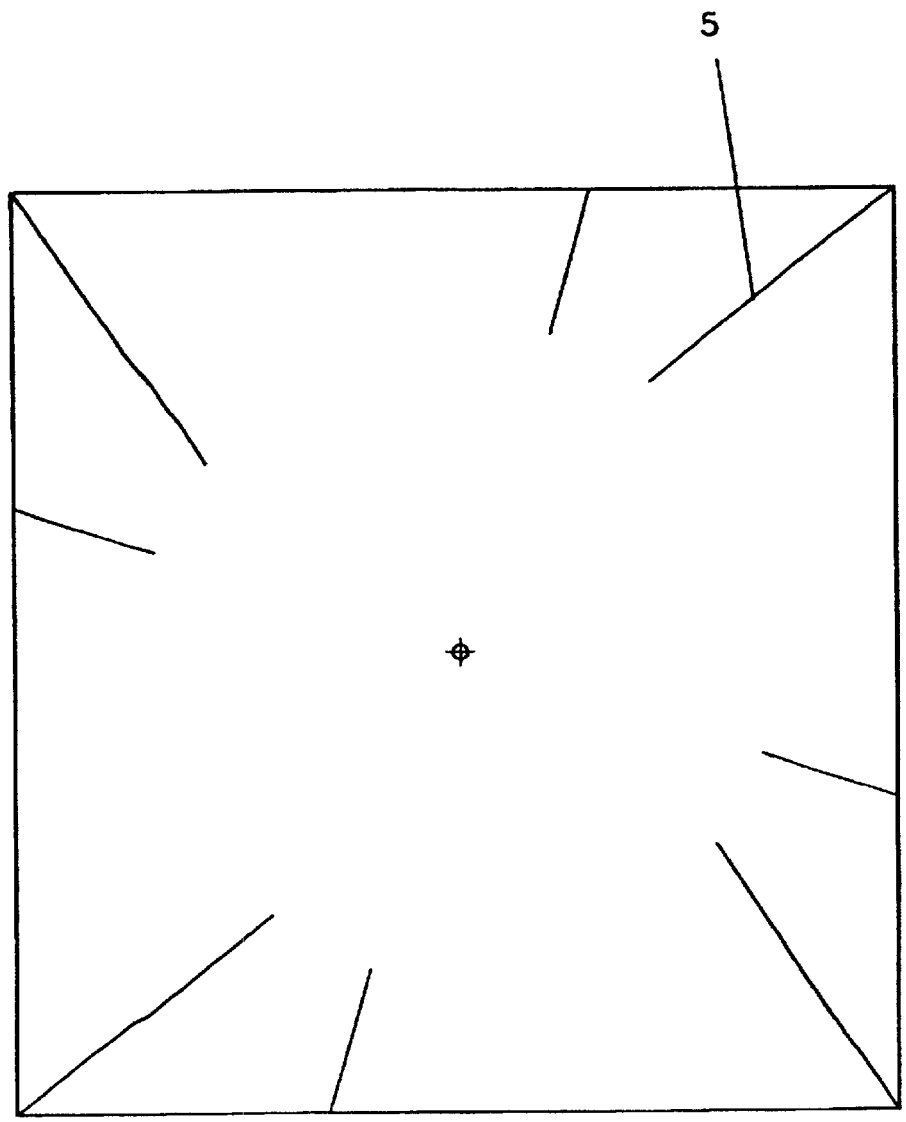
FIG. 4B is a top view of the stator blades showing their alignment.

In FIGS. 4, 4A and 4B, the stator blades (5) are arranged around the circumference of the rotor cage in equidistant pairs. In the preferred embodiment 8 blades are shown but more or fewer blades could be used without substantially departing from the broad aspect of the present invention. Unlike previous art, which had curved stator blades it has been found that straight stators that are offset from the center point allows air to enter the turbine with less turbidity and thus more force. When an attempt is made to bend or change the direction of air currents (as previous art has done with curved stator blades), the force of the wind may be greatly diminished. Straight stators, while directing air into the invention, can have, a minimal effect on the loss of kinetic energy. Stator blade offset angles of from 30° to 60° by increments of 1° have been tested, and it has been found that the optimal angle of offset from the center point for the stator blades is 45°. Changing this angle by as much as 1° can seriously degrade the performance of the turbine. For example, tests have shown that in a 40 mph wind, angling the stator blades at 44° will produce 200 kW less power over a 24 hour period than stator blades angled at 45°. The wind turbine has been designed to accept all available winds regardless of their speed and thus has no need for a stator design that would dampen or lessen the force of the wind.

Figure 5:
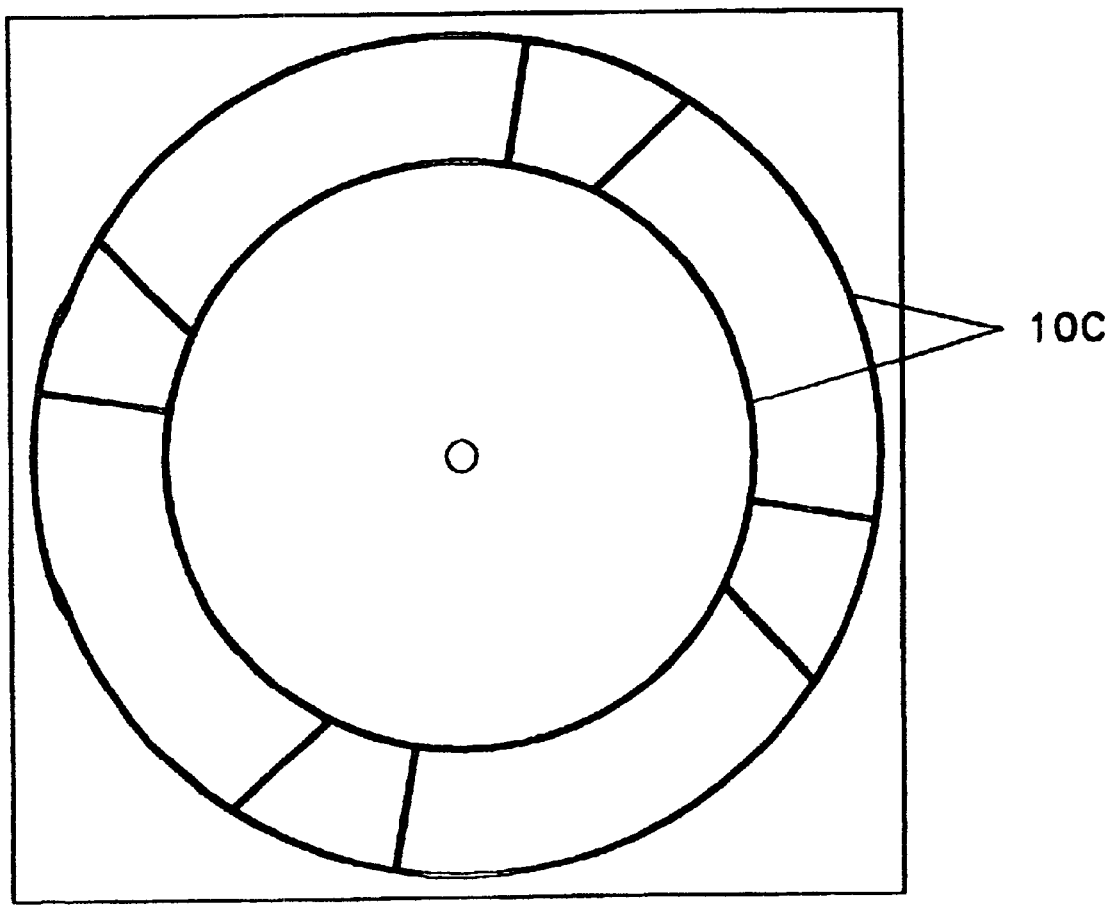
FIG. 5 shows the stator cage cover which allows the invention to be "topless".

FIG. 5 depicts the alignment of the stator cage cover. This is the part of the invention that allows the turbine to be virtually topless with regard to incoming currents of air. Once properly attached to the stator blades, the turbine is structurally sound and is ready to withstand, with regard to wind turbine embodiments, winds in excess of 100 m.p.h. Air currents approaching the rotor cage that have a slightly downward thrust pass through the open top (between the bearing races) and impact the rotor blades creating rotation. Previous art was able to accommodate wind currents that moved horizontally only, and thus, were able to accommodate only a portion of the wind that can be handled by the new invention.

The stator cage cover may be constructed concentric braces to ensure structural stability. On the top side of the concentric braces are bearing races to accommodate the top shield bearings.

Figure 6:
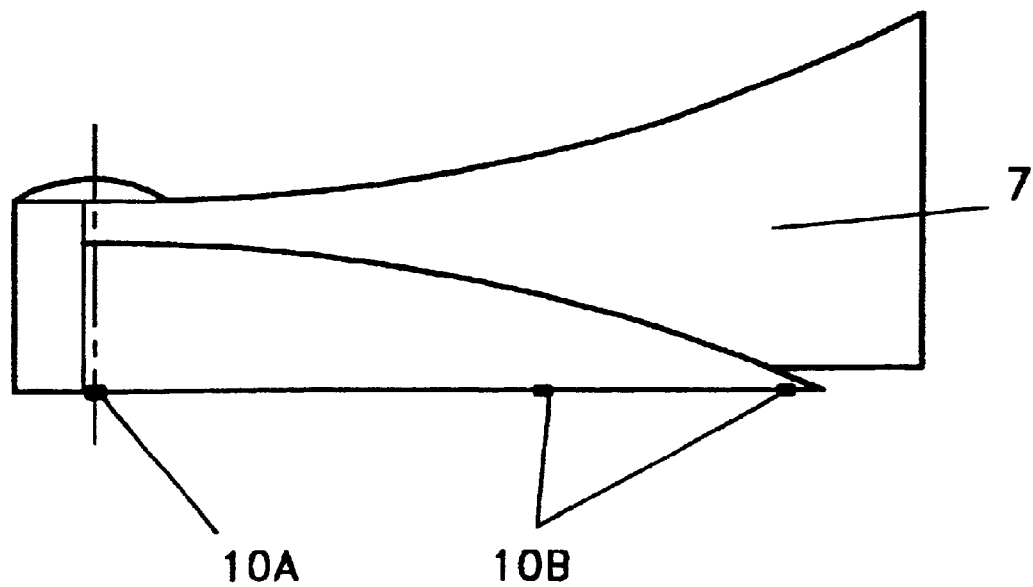
FIG. 6 is a view of the top shield from the side.
Figure 7:
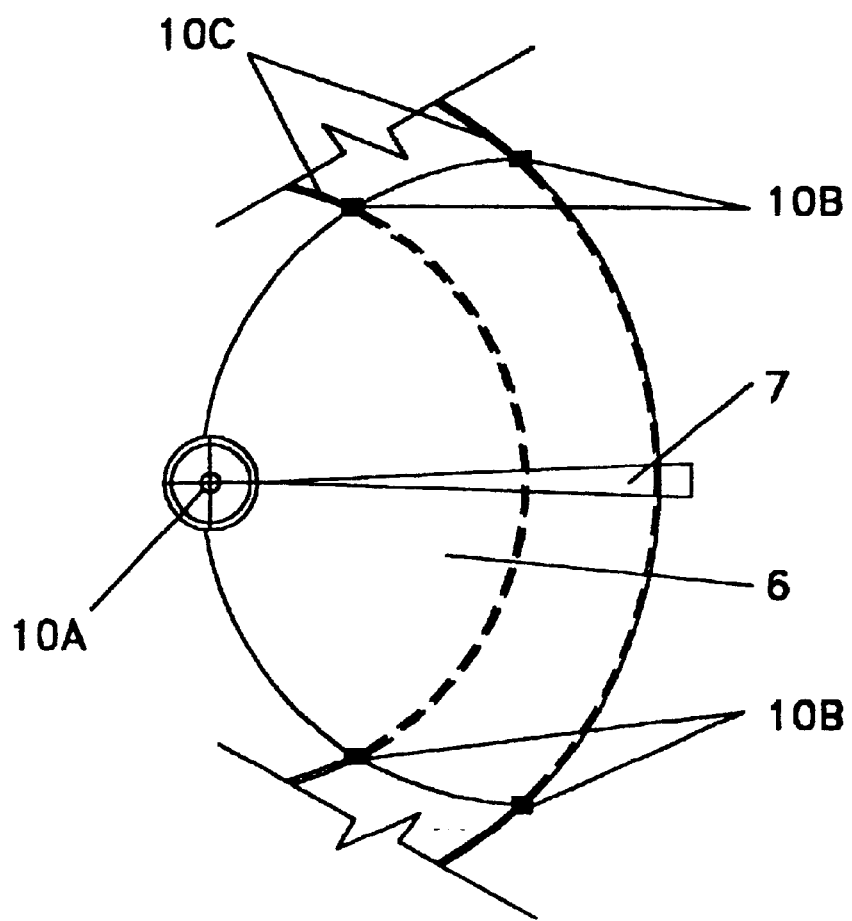
FIG. 7 is a perspective view of the top shield from above.

FIGS. 6 and 7 show the top shield and top shield vane. The vane can be designed to create enough drag to rotate the top shield to a downwind position. FIG. 1B depicts a second, alternative embodiment wherein the vane technique is not incorporated.

Once the shield is in proper position, wind with a downward thrust is also allowed to enter the wind turbine. (Modeling done to date shows that the open top embodiment increases performance by up to about 20%.) The top shield prevents conflicting winds from entering the invention from the downwind side that would interfere with rotation or exhausting. The space between the top shield and the rotor cage can create a space of calm air that may improve the invention's exhausting characteristics and that has a dampening feature. The front side or upwind or upcurrent side of the top shield is slightly convex on the horizontal plane and may prevent the top shield from buffeting during periods of high winds. The center bearing (10A) of the top shield (6) can allow the mechanism to pivot easily while wheels or bearings (10B) resting on the concentric bearing races (10C) may carry the weight of the top shield. The wind vane or tail of the top shield (7) can aid in the top shield's ability to move into a position opposing the wind and may enhance the shield's stability during operation.

In addition, the overall weight of the components can be an integral part of the invention. While mass (i.e., weight) can be used to dampen or deaden vibration, the new invention operates so smoothly that the lightweight carbon fiber materials used in its construction will not jeopardize structural integrity and will allow the turbine to be placed atop existing buildings or in environmentally sensitive areas or areas where large erection equipment would have no access.

As can be easily understood from the foregoing, the basic concepts of the present invention may be embodied in a variety of ways. It involves the use of light weight materials in the construction of wind turbines and both the enhanced harnessing of kinetic energy techniques resulting from the use of light weight construction material as well as devices to accomplish the appropriate harnessing of energy. In this application, the harnessing techniques are disclosed as part of the results shown to be achieved by the various devices described, including turbine systems, and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "shield" should be understood to encompass disclosure of the act of "shielding"—whether explicitly discussed or not—and, conversely, were there effectively disclosure of the act of "shielding", such a disclosure should be understood to encompass disclosure of a "shield" and even a "means for shielding". Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim at least: (i) each of the turbine devices as herein disclosed and described, (ii) the related methods disclosed and described, (iii) similar, equivalent, and even implicit variations of each of these devices and methods, (iv) those alternative designs which accomplish each of the functions shown as are disclosed and described, (v) those alternative designs and methods which accomplish each of the functions shown as are implicit to accomplish that which is disclosed and described, (vi) each feature, component, and step shown as separate and independent inventions, (vii) the applications enhanced by the various systems or components disclosed, (viii) the resulting products produced by such systems or components, and (ix) methods and apparatuses substantially as described hereinbefore and with reference to any of the accompanying examples, and (x) the various combinations and permutations of each of the elements disclosed. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

What is claimed is:

1. An improved lightweight vertically rotating wind turbine having enhanced conversion of wind kinetic energy into usable energy, comprising:

a. a wind-collecting base with a bottom surface defining an area and a top surface defining an area wherein said area of said bottom surface is larger than said area of said top surface and wherein said top surface comprises an energy-transfer element and wherein said wind-collecting base comprises an upward tapered base having an angle to smoothly direct wind currents;

b. a vertically rotating shaft with a top end and a bottom end wherein said bottom end is mechanically connected to said energy-transfer element;

c. an energy-utilizing device responsive to said shaft through said energy-transfer element of the top surface of said base;

d. a top plate attached in the vicinity of the top end of said vertically rotating shaft;

e. a bottom plate that defines a diameter and is attached to said vertically rotating shaft at a location above the top surface of said base;

f. a plurality of vertically oriented torque generating elements having outer edges and inner edges which are located circumferentially around said vertically rotating shaft between said top plate and said bottom plate and are attached to said round top plate and said round bottom plate at their ends to form a cage assembly;

g. a plurality of vertically oriented flat wind directing elements arranged circumferentially around said cage assembly and adjacent to said outer edges of said vertically oriented flat torque generating elements;

h. an open cover comprising concentric braces comprising two side bearings; and i. a top shield having a central pivoting point and an outer terminus above said side bearings of said open cover, the improvement wherein the wind turbine elements are constructed from lightweight materials which allow the enhanced conversion of wind kinetic energy into mechanical energy by the wind turbine.

2. The improved vertically rotating wind turbine as described in claim 1 wherein said upward tapered base angle to smoothly direct wind currents is between 20° to 45°.

3. The improved vertically rotating wind turbine as described in claim 2 wherein said top surface of said base comprises a square surface, wherein said bottom surface of said base comprises 8 corners and wherein said base comprises a special spacial geometry that has planar surfaces connecting said bottom surface to said top surface.

4. The improved vertically rotating wind turbine as described in claim 1 wherein said vertically rotating shaft is responsive to said cage assembly and passively rotates.

5. The improved vertically rotating wind turbine as described in claim 1 wherein each of said plurality of vertically oriented torque generating elements is solely attached to said top plate and said round plate at its ends to form said cage assembly.

6. The improved vertically rotating wind turbine as described in claim 5 wherein each of said torque generating elements has at least three differently oriented surfaces.

7. The improved vertically rotating wind turbine as described in claim 6 wherein each adjacent pair of said differently oriented surfaces comprises an angle wherein said angle is about 147°.

8. The improved vertically rotating wind turbine as described in claim 7 wherein said plurality of said torque generating elements comprises from 2 to 5 torque generating elements.

9. The improved vertically rotating wind turbine as described in claim 8 wherein said torque generating elements are free from said vertically rotating shaft wherein each of said inner edges of said torque generating elements and said vertically rotating shaft form a free space.

10. The improved vertically rotating wind turbine as described in claim 9 wherein said free space comprises an exhaust space.

11. The improved vertically rotating wind turbine as described in claim 9 wherein said torque generating elements comprise rotor blades.

12. The improved vertically rotating wind turbine as described in claim 11 wherein each of said rotor blades is about 20' in height.

13. The improved vertically rotating wind turbine as described in claim 12 wherein said rotor blades immediately accommodate all wind conditions from the full 360 degrees.

14. The improved vertically rotating wind turbine as described in claim 13 wherein said cage assembly comprises a rotor cage assembly wherein said top plate is a top rotor cage plate and said bottom plate is a bottom rotor cage plate.

15. The improved vertically rotating wind turbine as described in claim 14 wherein said rotor blades are capable of imparting rotation force upon said vertically rotating shaft indirectly through said rotor cage assembly during periods of sufficient wind currents.

16. The improved vertically rotating wind turbine as described in claim 15 wherein said rotor cage assembly is capable of responding to a change in current direction.

17. The improved vertically rotating wind turbine as described in claim 1 wherein said flat wind directing elements are attached to said base in equidistance pairs.

18. The improved vertically rotating wind turbine as described in claim 17 wherein said flat wind directing elements comprise at least two pairs.

19. The improved vertically rotating wind turbine as described in claim 18 wherein said flat wind directing elements comprise at least four pairs.

20. The improved vertically rotating wind turbine as described in claim 19 wherein each pair of said flat wind direct elements are circumferentially arranged on said base and comprise a wind current pathway with an entrance opening larger than an exit opening toward said rotor blades.

21. The improved vertically rotating wind turbine as described in claim 20 wherein said flat wind directing elements comprise stationary stator blades.

22. The improved vertically rotating wind turbine as described in claim 21 wherein said stator blades comprise flat vertical surfaces that have a minimal coefficient of friction when wind currents pass through them.

23. The improved vertically rotating wind turbine as described in claim 22 wherein said stator blades each face a specific direction to sufficiently accommodate wind current from that specific direction.

24. The improved vertically rotating wind turbine as described in claim 23 wherein the specific direction faced by said stator blades is an angle of about 45° from a center point defined by the vertically rotating shaft.

25. The improved vertically rotating wind turbine as described in claim 1 wherein said open cover comprises an open stator cage cover.

26. The improved vertically rotating wind turbine as described in claim 25 wherein said open stator cage cover comprises concentric bearing races that have a center bearing and two circular side bearings.

27. The improved vertically rotating wind turbine as described in claim 1 wherein said top shield comprises a laminated top shield.

28. The improved vertically rotating wind turbine as described in claim 27 and further comprising a calm wind surface which forms a calm wind area above at least a portion of said cage assembly.

29. The improved vertically rotating wind turbine as described in claim 28 wherein said calm wind area comprises an exhaust area.

30. The improved vertically rotating wind turbine as described in claim 28 wherein said calm wind surface comprises a convex surface on its upcurrent side and a concave surface on its downcurrent side, wherein said downcurrent side forms said calm wind area above said cage assembly.

31. The improved vertically rotating wind turbine as described in claim 30 wherein said calm wind area comprises an exhaust area.

32. The improved vertically rotating wind turbine as described in claim 31 wherein said top shield covers less than about one third of said open cover area above said open cover.

33. The improved vertically rotating wind turbine as described in claim 32 wherein said central pivoting point of said top shield is responsive to said central bearing of said open cover, wherein said outer terminus is responsive to said outer side bearing and wherein said top shield rotates in response to wind direction.

34. The improved vertically rotating wind turbine as described in claim 32 wherein said top shield enhances wind harness and wherein said top shield comprises a vane.

35. The improved vertically rotating wind turbine as described in claim 1 wherein said wind turbine comprises a long axis vertical turbine that is an omnicurrent turbine.

36. The improved vertically rotating wind turbine as described in claim 1 wherein said lightweight materials comprise sandwich panels comprising at least two outer face layers and a honeycomb core connecting them, such that the cells of the honeycomb core extend substantially perpendicular to the face layers.

37. The improved vertically rotating wind turbine as described in claim 36 wherein said lightweight materials are non-metallic.

38. The improved vertically rotating wind turbine as described in claim 37 wherein said non-metallic materials comprise an aramid fiber.

39. The improved vertically rotating wind turbine as described in claim 36 wherein said face layers are laminated.

40. The improved vertically rotating wind turbine as described in claim 36 wherein said honeycomb core comprises hexagonal cells.

41. The improved vertically rotating wind turbine as described in claim 36 wherein said honeycomb core comprises rectangular cells.

42. The improved vertically rotating wind turbine as described in claim 36, wherein said flat wind direct elements are each offset by an angle of about 45° from a center point defined by the vertically rotating shaft.

43. An improved lightweight vertically rotating wind turbine, having enhanced conversion of wind kinetic energy into usable energy, comprising:
   a. a base with a bottom surface defining an area and a top surface defining an area wherein said area of said bottom surface is larger than said area of said top surface and wherein said top surface comprises an energy-transfer element and wherein said base comprises an upward tapered base having an angle to smoothly direct wind currents;
   b. a vertically rotating shaft with a top end and a bottom end wherein said bottom end is mechanically connected to said energy-transfer element;
   c. an energy-utilizing device responsive to said shaft through said energy-transfer element of the top surface of said base;
   d. a top plate attached to said vertically rotating shaft;
   e. a bottom plate that defines a diameter and is attached to said vertically rotating shaft;
   f. a plurality of vertically oriented flat torque generating elements having outer edges and inner edges which are localized circumferentially around said vertically rotating shaft at a space between said top plate and said bottom plate and are attached therein to said top plate and said bottom plate at their ends to form a cage assembly;
   g. a plurality of vertically oriented flat wind directing elements arranged circumferentially around said cage assembly and adjacent to said out edges of said vertically oriented flat torque generating elements;
   h. an open cover comprising concentric braces; and
   i. a dampening top shield above said open cover having a central pivoting point and a convex front side surface with an outer terminus above said concentric braces above said open cover, the improvement wherein the wind turbine elements are constructed from lightweight non-metallic materials which allow the enhanced conversion of wind kinetic energy into mechanical energy by the wind turbine.

44. The improved vertically rotating wind turbine as described in claim 43 wherein said lightweight non-metallic materials comprise sandwich panels comprising at least two outer face layers and a honeycomb core connecting them, such that the cells of the honeycomb core extend perpendicular to the face layers.

45. The improved vertically rotating wind turbine as described in claim 44 wherein said lightweight non-metallic materials comprise aramid fibers.

46. The improved vertically rotating wind turbine as described in claim 44 wherein said honeycomb core comprises hexagonal cells.

47. The improved vertically rotating wind turbine as described in claim 44 wherein said honeycomb core comprises rectangular cells.

48. The improved vertically rotating wind turbine as described in claim 43 wherein said dampening top shield further comprises a shield of exhausting wind against counter-prevailing wind currents.

49. The improved vertically rotating wind turbine as described in claim 43 wherein said flat wind directing elements are each offset by an angle of about 45° from a center point defined by the vertically rotating shaft.

50. The improved vertically rotating wind turbine as described in claim 43 further comprising a top shield vane wherein said dampening top shield is responsive to said top shield vane.

51. The improved vertically rotating wind turbine as described in claim 44, wherein said flat wind directing elements are each offset by an angle of about 45° from a center point defined by the vertically rotating shaft.

* * * * *